United States Patent [19]

Guess et al.

[11] 3,821,999
[45] July 2, 1974

[54] ACOUSTIC LINER
[75] Inventors: Arnold W. Guess, Corona Del Mar; Guenter M. Schindler, Palos Verdes Peninsula, both of Calif.
[73] Assignee: McDonnell Douglas Corporation, Santa Monica, Calif.
[22] Filed: Sept. 5, 1972
[21] Appl. No.: 286,457

[52] U.S. Cl......... 181/33 H, 181/33 G, 181/33 HA, 181/33 HB, 181/33 D, 244/1 N, 161/68, 161/69, 55/276
[51] Int. Cl......... G10k 11/04, E04b 1/99, F01n 1/10
[58] Field of Search........... 181/33 G, 33 H, 33 HA, 181/33 HB, 50; 244/117–119, 1 N; 55/276; 161/68, 69

[56] References Cited
UNITED STATES PATENTS
3,481,427  12/1969  Dobbs et al...................... 181/33 G
3,542,152  11/1970  Adamson et al..................... 181/50
3,640,357   2/1972  Kitching et al................... 181/33 G
3,699,481  10/1972  Thompson et al................. 181/33 G

*Primary Examiner*—Richard B. Wilkinson
*Assistant Examiner*—Vit W. Miska
*Attorney, Agent, or Firm*—Robert O. Richardson; Walter J. Jason; Donald L. Royer

[57] ABSTRACT

An acoustic liner consisting of a perforated honeycomb sandwich panel wherein the axes of the honeycomb cells are tilted relative to the outer surface for more effective absorption of high amplitude sound and shock waves over a relatively narrow band of the frequency spectrum. An application is in the prevention of the harmonic content of the shock pattern from changing to lower frequencies.

4 Claims, 4 Drawing Figures

PATENTED JUL 2 1974 3,821,999

ACOUSTIC LINER

BACKGROUND OF THE INVENTION

Large turbofan aircraft engines operating with supersonic fan blade tip speed produce a "buzz-saw" low frequency noise of high intensity with a sound pressure greater than about 0.1 p.s.i. This noise is undesirable both inside the aircraft cabin and on the ground.

Perforated plate liners around the front of the engine have been used to reduce fan noise from turbofan aircraft engines. However, until the present invention, experimental use of these liners have been only partially successful. The effectiveness of the liner changes unfavorably with the different rotor speeds of the engine.

SUMMARY OF THE INVENTION

The acoustic liner of the present invention includes a perforated plate liner which absorbs the high amplitude sound and shock waves over a relatively narrow frequency band. By absorbing the sawtooth shock waves close to the source (supersonic tips of turbine blades) the harmonic content of the shock waves cannot shift to the lower frequencies. As a consequence, the level of the annoying low frequency noise produced by such change in harmonic content is reduced within the aircraft cabin to enhance passenger comfort. It also lowers the level of this type of noise on the ground during the period of takeoff.

Briefly, the acoustic liner consists of a perforated plate with a partitioned backing to form air cavities behind the plate. The axes of the backing celles are tilted relative to the perpendicular to the perforated plate so as to introduce two additional degrees of freedom, the tilt angle of the cell axis and the azimuth angle, i.e., the direction of the projection of the cell axis on the perforated plate relative to airflow past the plate. This use of slanted cavities provides maximum absorption of high intensity pure tone and shock waves in contrast to previous liners which absorb low amplitude sound. A second advantage is that a slightly irregular sawtooth shock pattern, such as may be found in the immediate vicinity of the supersonic blade tips of a turbofan engine, can be absorbed at a single frequency before the many low-frequency harmonic components develop and therefore only narrow band resonant properties for the liner are necessary. A third advantage is that a perforated plate liner to reduce buzz-saw noise from a turbofan engine may be properly designed without resorting to expensive trial and error methods. This produces additional advantages of greater efficiency, smaller size, and less weight over liners determined by other means.

In designing an acoustic liner in accordance with the present invention, the environmental conditions of steady airflow, amplitude, frequency and angle of incidence of sound on the liner are taken into account. Special consideration is given to the porosity (fraction open area), depth of cell backing, and orientation of cell axis with the incident sound or shock waves for optimum acoustic absorption for the specific environmental conditions. The dimensions of the perforated plate (percent open area, hole diameter, plate thickness) and cell backing (depth of backing cell cross section, tilt angle and projection angle of the cell axis) are calculated rather than determined experimentally. A teaching of how to make such calculations may be had with reference to "Calculation of Perforated Plate Liner Parameters From Specified Acoustic Resistance and Reactance" by A. W. Guess, Ph.D., Physical Sciences and Mathematics, identified as Science Research Report No. SR-156. A copy of this report is in the U.S. Patent Office files relating to this application and is incorporated herein by reference.

DETAILED DESCRIPTION OF THE DRAWINGS

Figure 1:
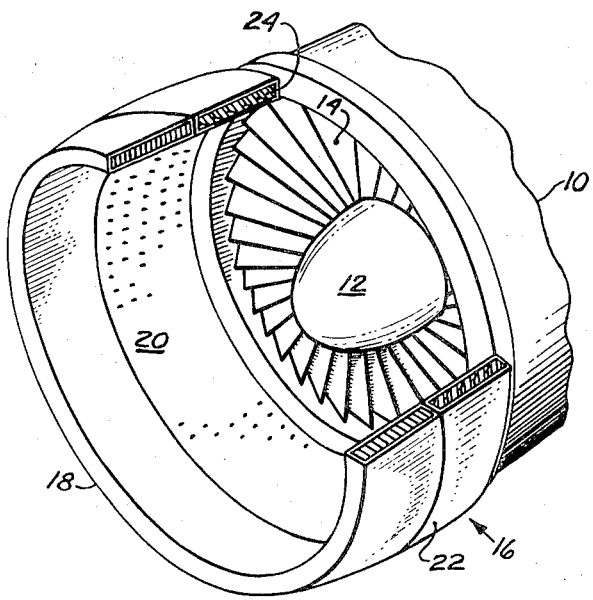
FIG. 1 is a perspective illustration of an acoustic liner in front of the blades of an aircraft jet engine.

In FIG. 1 there is shown a portion of an aircraft jet engine 10 having a hub 12 and rotor blades 14. This engine typically will be attached to the wings, fuselage, or tail of an aircraft through appropriate mountings, not shown. Forwardly of the plane of rotation of blades 14 is an extension of the housing of engine 10. This forward extension 16, in the case of a currently applicable embodiment, is an acoustic liner of about a foot in length and has an inner diameter of about seven feet. Its thickness is determined by the thickness of the forward housing portion 18 and the housing of engine 10. This liner 16 consists of a perforated inner plate 20, an outer cover 22 and a layer of tilted partitioned structure such as honeycomb 24 sandwiched in between.

The velocity of blades 14 as they rotate around hub 12 differs in the takeoff, cruise and landing modes of the aircraft. The worst noise problem often occurs during takeoff so the blade velocity at takeoff may determine the frequency of the acoustic field environment to which the acoustic liner 16 is designed. In an illustrative application 38 blades of a 3½ foot radius and a velocity of 3600 revolutions per minute, provides a blade tip passage frequency over any point on the liner of approximately 2280 cycles per second (Hertz). For audio sound suppression purposes, this is considered as fairly high frequency since by comparison, middle C on the piano is about 500 cps. Low frequency is herein defined as any frequency below that of the rotor blade passage frequency over a point about its periphery.

As the wave front from the blade tip moves forward from the plane of the blades, the single frequency sound generated by the blades distorts. The frequency content changes to lower frequencies, which are multiples of 60 Hz (rotor frequency). By dampening the high frequency near its source, the magnitude of the low frequency harmonic components is lessened.

Since the blades 14 are slanted, as they revolve, the shock wave off the leading edge of a supersonic blade tip has a spiral corkscrew pattern and spinning waves are produced. Since sound waves are oscillations of fluid particles (air), when the axis of the cellular cavities in an acoustic liner are aligned approximately parallel with the direction of propagation of the sound waves, their entrance into the cavities for absorption purposes is more efficient. Hence, in absorbing sound waves generated by engine fan blades, the axis of the cellular cavities should be slanted such that the spinning acoustic and shock waves which propagate at an angle to the axis of the inlet duct may be absorbed. In aligning the cell axis as nearly as possible with the direction of propagation of the sound waves, a better entrance into the cell is provided for the oscillating fluid (air) particles and thus the cell becomes more efficient in its sound attenuation.

Figure 3:
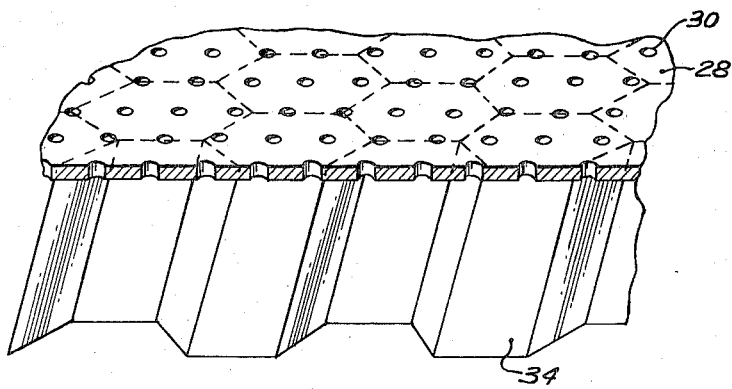
FIG. 3 is a sectional view taken through the perforated plate and cellular cavities.
Figure 2:
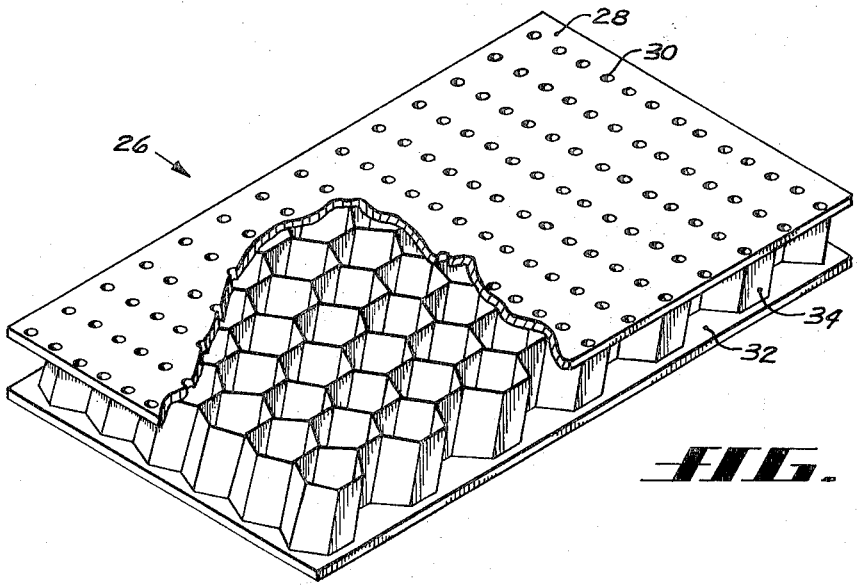
FIG. 2 is an enlarged fragmentary view of an acoustic liner comprising a perforated plate over a layer of tilted cellular cavities terminating in a backing plate.

Reference is now made to FIG. 2 which shows an acoustic panel 26 made in accordance with the present invention. This panel comprises an upper plate 28 having perforations 30 thereon, a backing plate 32, and a layer of partitioned cellular material such as honeycomb 34 sandwiched in between. The cellular walls have a tilt angle and an azimuth angle relative to the planes of the plates and the angle of expected steady airflow over the perforations 30. While the plates 28 and 32 are parallel and flat, they may be arcuate and have compound curves or other configurations to conform to the desired usage. FIG. 3 shows an enlarged fragmentary portion of the perforated plate 28 and the cellular material 34 with its inclined walls. This is even more evident in the enlarged view in FIG. 4.

Figure 4:
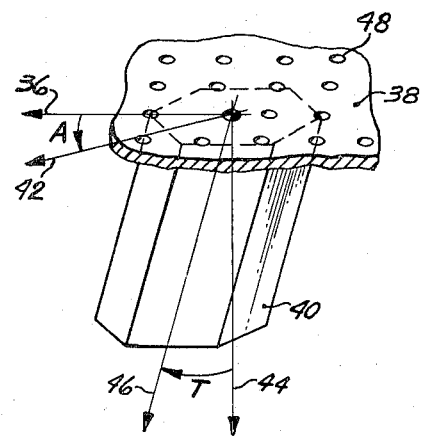
FIG. 4 is a similar sectional view illustrating the slant angularization of the cellular cavities.

In FIG. 4 arrow 36 represents the direction of movement of an aircraft (opposite to direction of steady airflow past perforated plate 38 backed by cellular cavity 40). Arrow 42 is a projected direction of the cell axis 46 on the plane of plate 38 and the angle between the two is the azimuth angle A. Arrow 44 is perpendicular to the plane of plate 38 whereas arrow 46 represents the cell axis direction. The angle T between the two is the tilt angle. These angles, as well as the dimensions of the perforated plate 38 (percent open area, diameter of holes 48, plate thickness) and cell backing (depth of backing, cell cross section and including the tilt and azimuth angle) may be calculated as follows:

a. The environmental parameters at which the liner is supposed to operate must first be determined. This involves determination of the frequency, intensity (amplitude), and direction of propagation of the high-amplitude sound to be absorbed, as well as the airflow velocity past the liner. When applied to reduction of "buzz-saw" noise from turbofan engines, the liner should be positioned as close as possible to the fan blade tips.

b. The percent open area (porosity) of the plate is then calculated from the environmental parameters determined in Step a. (Usually, the higher the amplitude the greater the open area should be). The percent open area is chosen such that the absorption coefficient at resonance is very high (near unity).

c. Values are then chosen for the hole diameter, plate thickness, and cell cross section in a manner that meets requirements for strength and weight considerations. Drainage and cleaning considerations may assist in defining these dimensions (and may also require drainage holes between cells). In one embodiment a plate thickness of 0.04" and a hole diameter of 0.1" met the structural integrity requirements.

d. The cell (backing) depth is calculated after choice of liner resonance frequency. When applied to "buzz-saw" noise in turbofan engines, either of two methods can be used:

i. The most straightforward method is to choose the lowest liner resonance frequency equal to the blade passage frequency.

ii. A more sophisticated method is to choose the second liner-resonance-frequency (with a narrow resonance) equal to twice the blade passage frequency. The lowest liner-resonance-frequency (with a broad resonance) will not, in this case, coincide exactly with the blade passage frequency, but the absorption coefficient will still have a high value (near unity) at blade passage frequency. This method leads to a liner that absorbs two harmonics (first and second) and therefore is best for application to a sawtooth shock profile.

Alternatively, the second liner-resonance-frequency could be chosen equal to blade passage frequency for aircraft takeoff, with the first liner-resonance-frequency approximately equal to blade passage frequency for approach and landing. Thus the liner serves two functions.

e. The tilt angle T and the azimuth angle A is then chosen in a manner such that the cell axis lines up as closely as possible with the propagation direction of the incident sound waves, consistent with strength and liner area requirements. The available space for installation may impose a limit such that the angle T must be greater than a certain value in order to achieve the proper cell depth as calculated in Step d. Under some circumstances (e.g., if the propagation direction of the incident sound waves is not known), the angles T and A may have to be varied and the best alignment of the cell axis be determined experimentally.

The present invention can be used in any situation where it is desired to absorb high-amplitude sound or sawtooth shock waves over a relatively narrow frequency range. The main use towards which the present invention is directed is the suppression of noise from large turbo-fan aircraft engines operating with either subsonic or supersonic fan blade tip speeds. The device offers itself for retrofit of existing turbofan engines in an optimum manner, as well as for inclusion in the design of new engines. An important specific application is in the prevention from developing "buzz-saw" (low frequency) noise.

Another possible use is the lining of exhaust systems of internal combustion engines to reduce emitted noise. Thus, a new type of "straight through" exhaust muffler system could be designed, with maximum absorption set for a particular engine speed.

Still another possible use of the invention is the absorption of high-amplitude underwater acoustic pressure waves created by a ship or submarine propeller. The underwater surfaces near the propeller can be plated with the liner so as to lessen the propeller noise.

Having thus described an illustrative embodiment of the present invention, it is to be understood that modifications thereof will become apparent to those skilled in the art and it is to be understood that these deviations are to be construed as part of the present invention.

We claim:

1. In combination with an engine having rotor blades generating an airflow and acoustic field from the tips thereof, a slant cell cavity perforated acoustic liner positioned about the periphery and adjacent to the plane of rotation of said blades, said liner comprising a backing plate, a perforated face plate, and a layer of partitioned cellular material between said plates, said layer having cellular cavities extending between said plates with the axes of said cavities extending through said plates at angles other than normal thereto, said cavities having walls of a length greater than the spacing between said plates, said walls being inclined in azimuth and pitch relative to the axis of rotation of said rotor blades and in a direction approximately parallel to the expected direction of propagation of sound waves from said acoustic field over said perforated face plate, said liner being tuned to absorb high-intensity sound and sawtooth shock waves in said acoustic field to thereby suppress low frequency noise emanating therefrom.

2. The method of suppressing with an acoustic liner around the fan blades of a jet engine noise over a relatively narrow frequency range, said fan having a first operating condition of one fan speed and a second operating condition of another fan speed, wherein said fan generates a noise of a first frequency range under said first operating condition and a second frequency under said second operating condition, said method comprising:

a. determining the environmental parameters in which said acoustic liner is to operate, including the angular direction of propagation of waves from said fan blades on said liner, b. providing said liner with a sufficient open area to obtain an absorption coefficient at resonance approaching unity, c. providing attenuation cavities in said liner having liner resonance frequencies substantially equal to said first frequency range and to said second frequency range, and d. positioning the angular direction of walls of said cavities in azimuth and pitch substantially parallel to the angular direction of propagation of said waves from said blades on said liner.

3. The method of suppressing noise with an acoustic liner as in claim 2, wherein said cavities have liner resonances substantially equal to the frequency of the waves to be absorbed and also equal to a harmonic of said frequency.

4. The method of suppressing noise with an acoustic liner as in claim 2 wherein the noise suppressed is a low frequency noise derivative from a high frequency source over a narrow frequency range and said liner is tuned to the narrow frequency range of the high frequency source.

* * * * *